US008562439B2

(12) United States Patent
Shuman et al.

(10) Patent No.: US 8,562,439 B2
(45) Date of Patent: Oct. 22, 2013

(54) GEOGRAPHIC AREA TEMPLATES FOR COMPUTER GAMES

(75) Inventors: Michael V. Shuman, Chicago, IL (US); Kurt Brooks Uhlir, Chicago, IL (US); Christopher Dougherty, Highland Park, IL (US)

(73) Assignee: Navteq B.V., Veldhoven (NL)

( * ) Notice: Subject to any disclaimer, the term of this patent is extended or adjusted under 35 U.S.C. 154(b) by 1650 days.

(21) Appl. No.: 10/798,632

(22) Filed: Mar. 11, 2004

(65) Prior Publication Data
US 2005/0202862 A1 Sep. 15, 2005

(51) Int. Cl.
*A63F 13/00* (2006.01)
*G06F 17/00* (2006.01)
(52) U.S. Cl.
USPC .............................................. 463/42; 707/802
(58) Field of Classification Search
USPC ........................... 463/25–43; 434/43, 38, 150
See application file for complete search history.

(56) References Cited

U.S. PATENT DOCUMENTS

| | | | | |
|---|---|---|---|---|
| 2,026,082 | A | 12/1935 | Darrow | 273/134 |
| 4,097,051 | A | 6/1978 | Goldberg et al. | |
| 4,645,459 | A * | 2/1987 | Graf et al. | 434/43 |
| 5,184,956 | A * | 2/1993 | Langlais et al. | 434/69 |
| 5,526,479 | A | 6/1996 | Barstow et al. | 395/152 |
| 5,566,073 | A | 10/1996 | Margolin | 701/231 |
| 5,573,402 | A | 11/1996 | Gray | 434/69 |
| 5,616,079 | A | 4/1997 | Iwase et al. | 463/32 |
| 5,618,043 | A | 4/1997 | McGlew | 273/308 |
| 5,651,676 | A * | 7/1997 | Artwick | 434/43 |
| 5,660,547 | A * | 8/1997 | Copperman | 434/29 |
| 5,823,780 | A * | 10/1998 | Arye et al. | 434/38 |
| 6,023,278 | A | 2/2000 | Margolin | 345/419 |
| 6,146,143 | A * | 11/2000 | Huston et al. | 434/69 |
| 6,171,186 | B1 * | 1/2001 | Kurosawa et al. | 463/31 |
| 6,173,277 | B1 | 1/2001 | Ashby et al. | |
| 6,183,364 | B1 | 2/2001 | Trovato | 463/32 |
| 6,266,614 | B1 | 7/2001 | Alumbaugh | 701/211 |
| 6,268,858 | B1 | 7/2001 | Nathman et al. | 345/419 |

(Continued)

FOREIGN PATENT DOCUMENTS

EP 1 107 189 6/2001
JP 06202557 A * 7/1994

(Continued)

OTHER PUBLICATIONS

3D Nature PLC, Ltd.; "Comparison of features" *World Construction Set, Visual Nature Studio*, 'Online!', XP002335684, http://web.archive.org/web/20031206133238/http://www.3dnature.com/comparingfeatures.html>, entire document (Dec. 2003).

(Continued)

*Primary Examiner* — Masud Ahmed
(74) *Attorney, Agent, or Firm* — Lempia Summerfield Katz LLC

(57) ABSTRACT

A system and method are disclosed for facilitating development of computer games that depict or represent actual, real world geographic areas as part of the play scenarios of the games. A source database contains data that represent geographic features in a region including roads in the region. The data in the source database includes attributes suitable for use for providing navigation-related functions. In addition to providing data from the source database for navigation-related functions, data from the source database are also used to form a template database, wherein the template database represents an imaginary locale. The template database is provided for computer game development.

39 Claims, 8 Drawing Sheets

(56) References Cited

U.S. PATENT DOCUMENTS

| | | | |
|---|---|---|---|
| 6,289,276 | B1 | 9/2001 | Ahrens et al. ............... 701/200 |
| 6,343,301 | B1* | 1/2002 | Halt et al. .................. 707/203 |
| 6,362,817 | B1 | 3/2002 | Powers et al. .............. 345/419 |
| 6,401,033 | B1 | 6/2002 | Paulauskas et al. .......... 701/207 |
| 6,489,963 | B2 | 12/2002 | Parikh et al. |
| 6,509,869 | B2 | 1/2003 | Aoyama ................ 342/357.13 |
| 6,612,925 | B1 | 9/2003 | Forsberg ........................ 463/6 |
| 6,677,858 | B1 | 1/2004 | Faris et al. ................. 340/573.1 |
| 6,772,142 | B1 | 8/2004 | Kelling et al. |
| 6,961,055 | B2 | 11/2005 | Doak et al. ................. 345/419 |
| 7,038,694 | B1* | 5/2006 | Santodomingo et al. ..... 345/582 |
| 7,570,261 | B1 | 8/2009 | Edecker et al. |
| 7,970,749 | B2 | 6/2011 | Uhlir et al. |
| 2001/0034661 | A1 | 10/2001 | Ferreira |
| 2002/0063654 | A1 | 5/2002 | Aoyama ................ 342/357.13 |
| 2002/0091005 | A1 | 7/2002 | Shoji et al. .................... 472/65 |
| 2002/0187831 | A1 | 12/2002 | Arikawa et al. .............. 463/32 |
| 2002/0198694 | A1 | 12/2002 | Yang et al. |
| 2003/0059743 | A1* | 3/2003 | Lechner ........................ 434/43 |
| 2003/0195023 | A1 | 10/2003 | Di Cesare ...................... 463/9 |
| 2003/0214530 | A1 | 11/2003 | Wang et al. ................. 345/757 |
| 2003/0215110 | A1 | 11/2003 | Rhoads et al. ............... 382/100 |
| 2004/0078263 | A1 | 4/2004 | Altieri |
| 2004/0176936 | A1 | 9/2004 | Ohtsu et al. |
| 2004/0236543 | A1 | 11/2004 | Stephens |
| 2005/0159216 | A1 | 7/2005 | Chiu et al. ..................... 463/31 |

FOREIGN PATENT DOCUMENTS

| | | |
|---|---|---|
| JP | H10-154138 | 6/1998 |
| JP | 11-057209 | 3/1999 |
| JP | 2000-146619 | 5/2000 |
| JP | 2002-058872 | 2/2002 |
| JP | 2003-000940 | 1/2003 |
| JP | 2003-023357 | 1/2003 |
| JP | 2003-329449 | 11/2003 |
| WO | WO 02/26518 A1 | 4/2002 |
| WO | WO 02/39363 A1 | 5/2002 |

OTHER PUBLICATIONS

Koller et al., "Virtual GIS: A Real-Time 3D Geographic Information System", *Proceedings of 6th IEEE Visualization Conference*, XP002335667, pp. 94-100 (Oct. 1995).
*Microsoft Flight Simulator 2002 Software Development Kit*; Autogen, XP002335786, pp. 4, 6-8, http://microsoft.com/games/flightsimulator/fs2002_downloads_sdk.asp#scenery>; Apr. 2002.
Muller, Chris; Denney, Eddie; *AVSIM Commercial Scenery Review*; Real Scene U.S. Terrain Mesh Scenery for FS2002; XP002335787, entire document; http://www.avsim.com/pages/0402/realscene_terrainmesh/rs_us_tms.html; Apr. 2002.
Klaus, Todd; Terra Scene V2.0, TerraScene Scenery Generation System—Tutorials and Reference Guide; XP002335169, pp. 1-63; http://library.avsim.net/sendfile.php?; Apr. 2004.
Cable, Tim; Klaus, Todd; *AVSIM Freeware Utility Review*, Terra Scene, XP002335170, entire document, http://avsim.com/pages/0500/terrascene/terrascene.shtml> May 2000.
*3D Nature*: "What is Visual Nature Studio" EP002335442, entire document http://web/archive.org/web/20040202220153; http://wwww.3dnature.com/vnsinfo.html>, Feb. 2004.
Freedman, Jonah, *Map Quests*, XP002335320, 1 page, http://www.wired.com/wired/archive/12.02/play_pr.html> Feb. 2004.
Quick, After Him: Pac-Man WentThataway, The New York Times, Section 9—Sunday Styles, pp. 1 and 11. (May 9, 2004).
Pac Manhattan, http://pacmanhattan.com/yourcity.php, pp. 1-3, (2004).
Map Quests, WIRED, p. 052 (Feb. 2004).
SimCity 2000 User's Manual (for Super Nintendo), 1996.
SimCopter User's Manual, 1996.
Photography of side of SimCity200 box, 1993.
SimCity 2000 User's Manual (for PC), 1993.
Game Information of True Crime: Streets of L.A., release date Aug. 1, 2003, p. 1-2, accessed online at: http://www.xbox.com/en-US/games/t/truecrimestreetsofla/ on Jan. 4, 2008.
Radcliffe, Doug, Mahood, Andy; SYBEX Official Strategies & Secrets, Microsoft Flight Simulator 2004, A Century of Flight, 2003, pp. 10-13, 112-113, 134-135, 146-147, 170-171, 180-181.
Stephen M. Ervin, "Landscape Visualization with Emaps", IEEE, 1993, pp. 28-33, http://ieeexplore.ieee.org/stamp/stamp.jsp?tp=&arnumber=204963 (2009).
William Cartwright, "Metaphor and Gaming and Access to Spatial Information", paper for 4th E-Mail Seminar on Cartography 2001 "Cartographic Education", pp. 1-7 www.uacg.bg/UACEG_site/sem_geoWilliam%Cartwright.doc (2009).
www.mapquest.com. 1 page: 1997. http://web.archive.org/web/19970410221743/http://www.mapquest.com/.
Wikipedia reference. 6 pages, retrieved on Jun. 16, 2009 in related case. http://en.wikipedia.org/wiki/Streets_of_SimCity.
Japanese Office Action in Japanese Application No. 2013-019831, mailed May 7, 2013.
Shinoaki, Perfect Illustration Visual GIS, Oct. 30, 2002, p. 203, First Edition.
Watanabe, City Modeling Large Scale Three Dimensional City Model Creation Became Common, Sep. 8, 2000, No. 168, pp. 94-119, Nikkei Business Publications, Inc.
Yamada, From Car Navigation to Business Map Power of Electronic Map, Nov. 7, 1998, pp. 34-36, Nikkei Business Publications, Inc.

\* cited by examiner

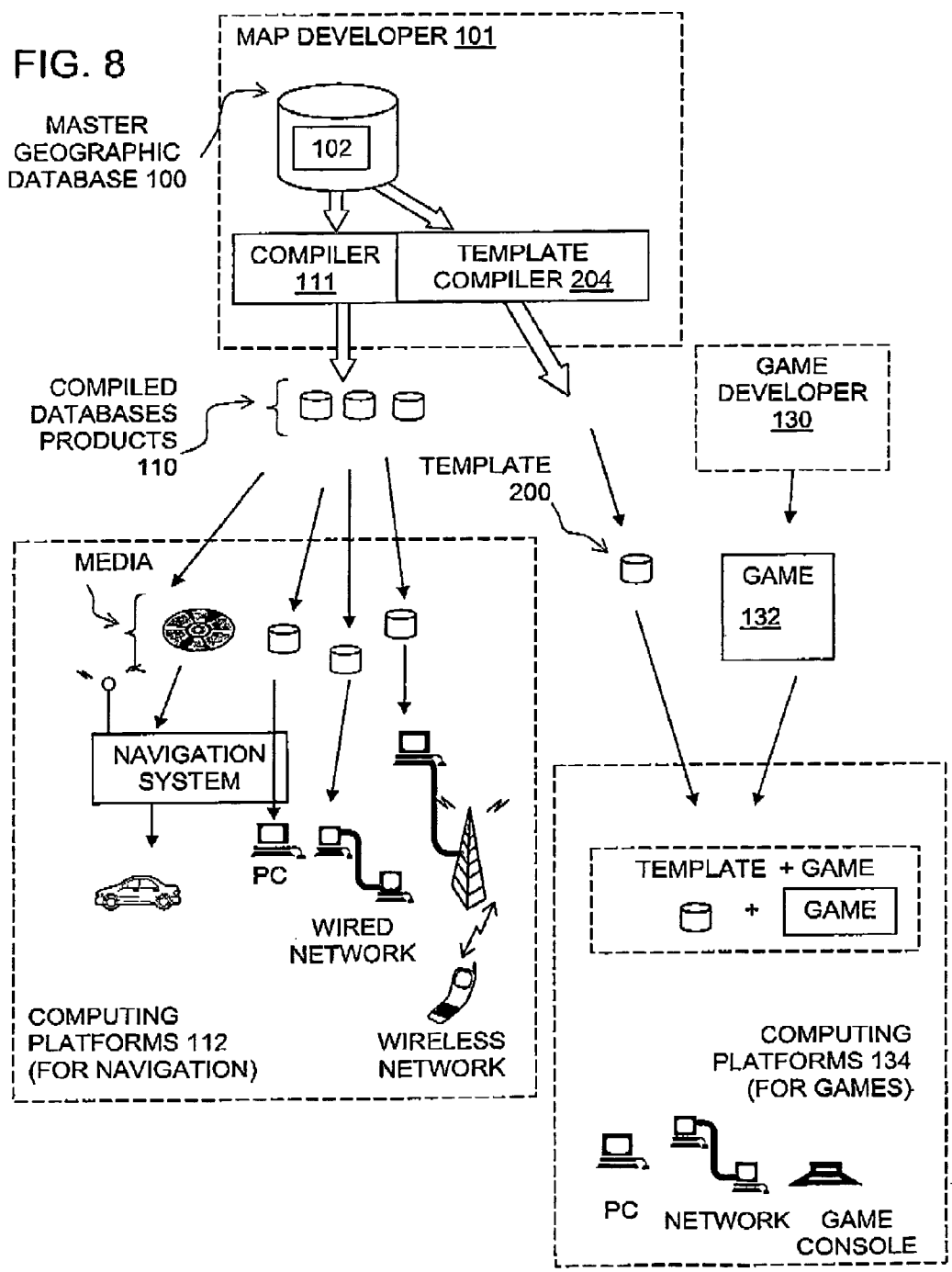

GEOGRAPHIC AREA TEMPLATES FOR COMPUTER GAMES

REFERENCE TO RELATED APPLICATIONS

The present application is related to copending patent applications entitled "METHOD AND SYSTEM FOR USING GEOGRAHIC DATA IN COMPUTER GAME DEVELOPMENT", bearing application Ser. No. 10/798,459 filed Mar. 11, 2004, "APPLICATION PROGRAMMING INTERFACE FOR GEOGRAPHIC DATA IN COMPUTER GAMES", bearing application Ser. No. 10/798,531 filed Mar. 11, 2004, and "COMPUTER GAME DEVELOPMENT FACTORY SYSTEM AND METHOD", bearing application Ser. No. 10/798,703 filed Mar. 11, 2004, the entire disclosures of which are incorporated by reference herein.

BACKGROUND OF THE INVENTION

The present invention relates to a system and method that facilitate development of computer games and more particularly, a system and method that facilitate development of computer games that include representations or depictions of simulated real world geographic areas.

Computer games have developed in sophistication and commercial importance. Improvements in computer hardware and software have enabled computer games to provide realistic graphics and sound. With these advances, computer game users have come to expect that games meet high standards for richness and attention to detail. For computer games that are intended to represent real world places, such as road race games, users expect the games to provide convincing depictions of the real world, with attention to accuracy and detail.

Computer game developers have recognized the need to provide realistic depictions of places in computer games. This has placed a burden on computer game developers to obtain the data needed to portray geographic places with realistic detail and accuracy. The collection of such detailed geographic data about real world roads, places, etc., is time-consuming and expensive. Further, the collection of detailed real world data diverts the resources of computer game developers away from other important aspects of computer game creation, such as characters, story lines, and strategies. Thus, there exists a need to facilitate the collection and use of geographic data by game developers.

Another consideration related to the development of computer games is that the computer game developer may not want to depict an actual geographic location. Instead, the computer game developer may want to depict a location that appears similar to an actual location. For example, instead of depicting the actual city of Los Angeles, the computer game developer may want to depict a southern California city that is like Los Angeles. The computer game developer may want to do this for a variety of reasons. One reason is that it relieves the computer game developer of the burden of collecting the large amount of data needed to depict the actual city. Another consideration is that it allows the computer game developer to avoid having game players find discrepancies between the geographic location depicted in the computer game and the actual geographic locations. Still another consideration is that it allows a computer game developer to include advertising and product placements.

Even if a computer game developer decides to depict a location that is similar to an actual location instead of the real location, the computer game developer is still faced with the problem of obtaining enough geographic data from which to create the location that is similar to an actual location. Thus, modeling a city similar to Los Angeles requires a significant amount of effort in order to make the simulation realistic.

Accordingly, it is an objective to create representations of places that are like real places.

It is another objective to facilitate development of a computer games that represent or depict realistic appearing places that are similar to real places.

SUMMARY OF THE INVENTION

To address these and other objectives, the present invention includes a system and method for facilitating development of computer games that depict or represent actual, real world geographic areas as part of the play scenarios of the games. A source database contains data that represent geographic features in a region including roads in the region. The data in the source database includes attributes suitable for use for providing navigation-related functions. In addition to providing data from the source database for navigation-related functions, data from the source database are also used to form a template database, wherein the template database represents an imaginary locale. The template database is provided for computer game development.

BRIEF DESCRIPTION OF THE DRAWINGS

FIG. 8 is a block diagram showing another embodiment of a system for facilitating development of computer games using a template.

DETAILED DESCRIPTION OF THE PRESENTLY PREFERRED EMBODIMENTS

I. Source Geographic Database.

Figure 1:
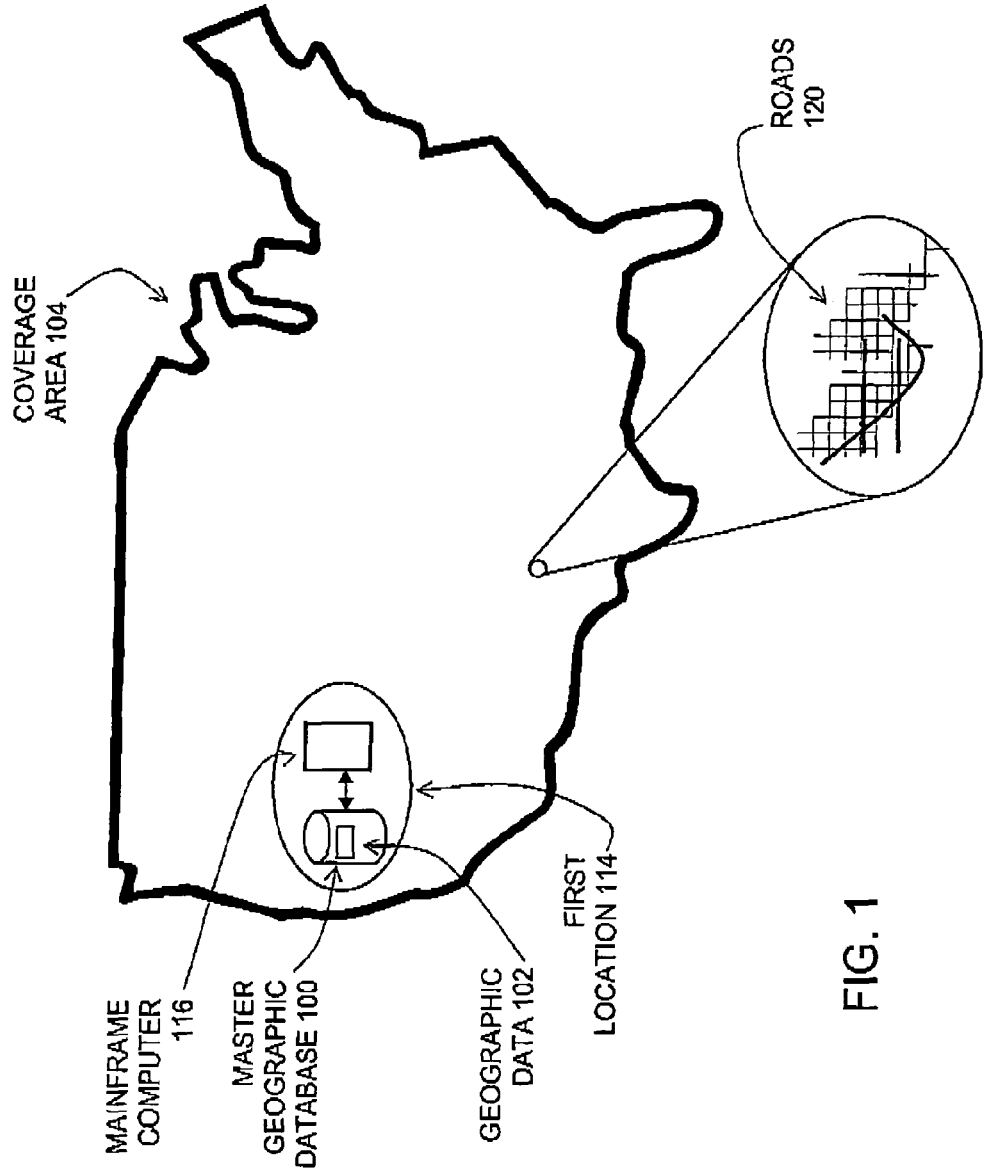
FIG. 1 is a diagram that illustrates a relationship between a master version of a geographic database and a coverage area.

FIG. 1 shows a master or source version of a geographic database 100. The master version of the geographic database is owned and developed by a geographic database developer 101 (also referred to as a "map developer", a "map data developer" or the like). (Although only one source database and geographic database developer are shown, the embodiments disclosed herein are not limited to only a single source database or a single geographic database developer.)

The master version of the geographic database 100 contains data 102 (also referred to a "geographic data" or "spatial data") that represent geographic features in a coverage area 104. The coverage area 104 may correspond to an entire country, such as the United States. Alternatively, the coverage area 104 may correspond to several countries, such as the United States, Canada, and Mexico, or France, Germany, and Italy, and so on. According to another alternative, the coverage area 104 of the master version of the geographic database 100 may represent only a single region within a country, such as the West Coast or the Midwest of the U.S. Although the master version of the geographic database 100 includes data that represent geographic features in the entire coverage area 104, there may be parts of the coverage area 104 that contain geographic features that are not represented by data in the geographic database, or for which the representation of geographic features is sparse.

The master version of the geographic database 100 includes data about a road network 120 located in the coverage area 104. The data about the road network 120 include various kinds of information, such as the geographic coordinates of positions of the roads, street names of the roads, addresses ranges along the roads, turn restrictions at intersections of roads, and so on. The master version of the geographic database 100 also includes data about points of interest in the covered area 104. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer to collect data. These ways include obtaining data from other sources, such as municipalities. In addition, the geographic database developer may employ field personnel to travel by vehicle along roads throughout the geographic region to observe features and record information about them. The data collected by the geographic database developer are stored in the master version of the geographic database 100.

The geographic database developer 101 continues to collect data that represent the features in the geographic coverage area 104 on an ongoing basis. One reason that the geographic database developer continues to collect data is that the features in the coverage area 104 change over time. Accordingly, the geographic database developer collects data about the same features in order to update or confirm the previously collected data about the features. Another reason that the geographic database developer continues to collect data is to expand the coverage and/or detail of the master version of the geographic database 100. For example, at one point in time the master version of the geographic database 100 may include data that represents only a portion of the entire coverage area 104. After that point in time, the geographic database developer collects data about features in areas that were not previously represented in order to expand the coverage of the master version of the geographic database 100.

The master version of the geographic database 100 is maintained as the copy that has the most up-to-date data relating to the coverage area 104. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the VSAM format and the GDF format, although other kinds of formats, both proprietary and non-proprietary, may be suitable. In general, the format of the master database 100 is not suitable for use in navigation systems.

A copy of the master version of the geographic database 100 is physically located at a first location 114. In one embodiment, the master version of the geographic database 100 is stored on one or more hard drives, tapes or other media, and accessed with an appropriate computer 116. Any suitable computer may be used, such as a mainframe computer, a plurality of networked microcomputers, etc.

II. First Embodiment

Figure 2:
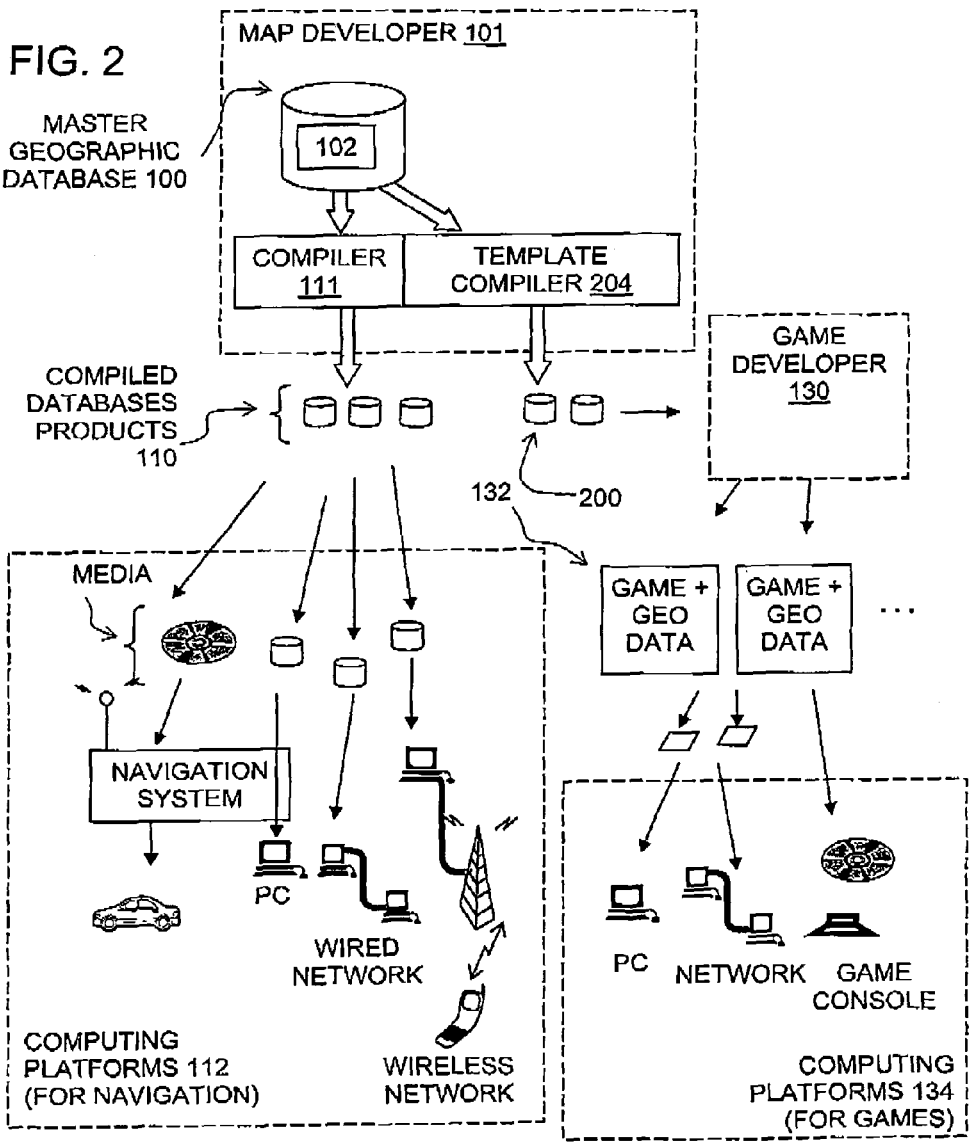
FIG. 2 is a block diagram showing a first embodiment of a system for facilitating development of computer games using a template derived from the geographic database of FIG. 1.

FIG. 2 shows an overview of a first embodiment of a system and method for facilitating the development of computer games using a template that includes representations of geographic features that are similar to actual geographic features. In FIG. 2, the master version of the geographic database 100 is used to make compiled database products 110. The compiled database products 110 are made using a compiler 111. The compiler 111 is a software program run on an appropriate computer platform.

The compiled database products 110 may include only portions of all the data in the master version of the geographic database 100. For example, the compiled database products 110 may include data that relate to only one or more specific sub-areas within the coverage area 104 of the master version of the geographic database 100. Further, the compiled database products 110 may include fewer than all the data attributes that describe geographic features represented in the master version of the geographic database 100.

The compiled database products 110 are used on various kinds of computing platforms. For example, the compiled database products 110 are used in computing platforms 112 used for navigation. The computing platforms 112 used for navigation include in-vehicle navigation systems, hand-held portable navigation systems, personal computers (including desktop and notebook computers), and other kinds of devices, such as personal digital assistant (PDA) devices, pagers, telephones, etc. The compiled database products 110 are also used on networked computing platforms and environments, including systems connected to the Internet.

The compiled database products 110 that are used in computing platforms used for navigation are stored on suitable media. For example, the compiled database products may be stored on CD-ROM disks, hard drives, DVD disks, flash memory, or other types of media that are available now or that become available in the future.

On the computing platforms 112 used for navigation, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

As stated above, a computer game developer may not want to depict an actual geographic locale, but instead may want to depict a geographic locale which is similar to an actual locale. Therefore, in addition to producing compiled database products 110 for use on computing platforms used for navigation, the geographic database developer 101 produces one or more geographic template products 200 for use by a computer game developer 130. In a present embodiment, the geographic template products 200 are produced by the geographic database developer 101 using a template compiler program 204, which is described in more detail below. The geographic template products 200 used by the computer game developer 130 may be similar to compiled database products 110 used in the computing platforms 112 used for navigation, except that the geographic template products 200 do not represent actual real world places. The geographic template products 200 may be provided on a suitable media, such as one or more CD-ROM disks, DVD disks, or hard drives. Alternatively, the geographic template products 200 may be provided over a network connection.

Figure 3:
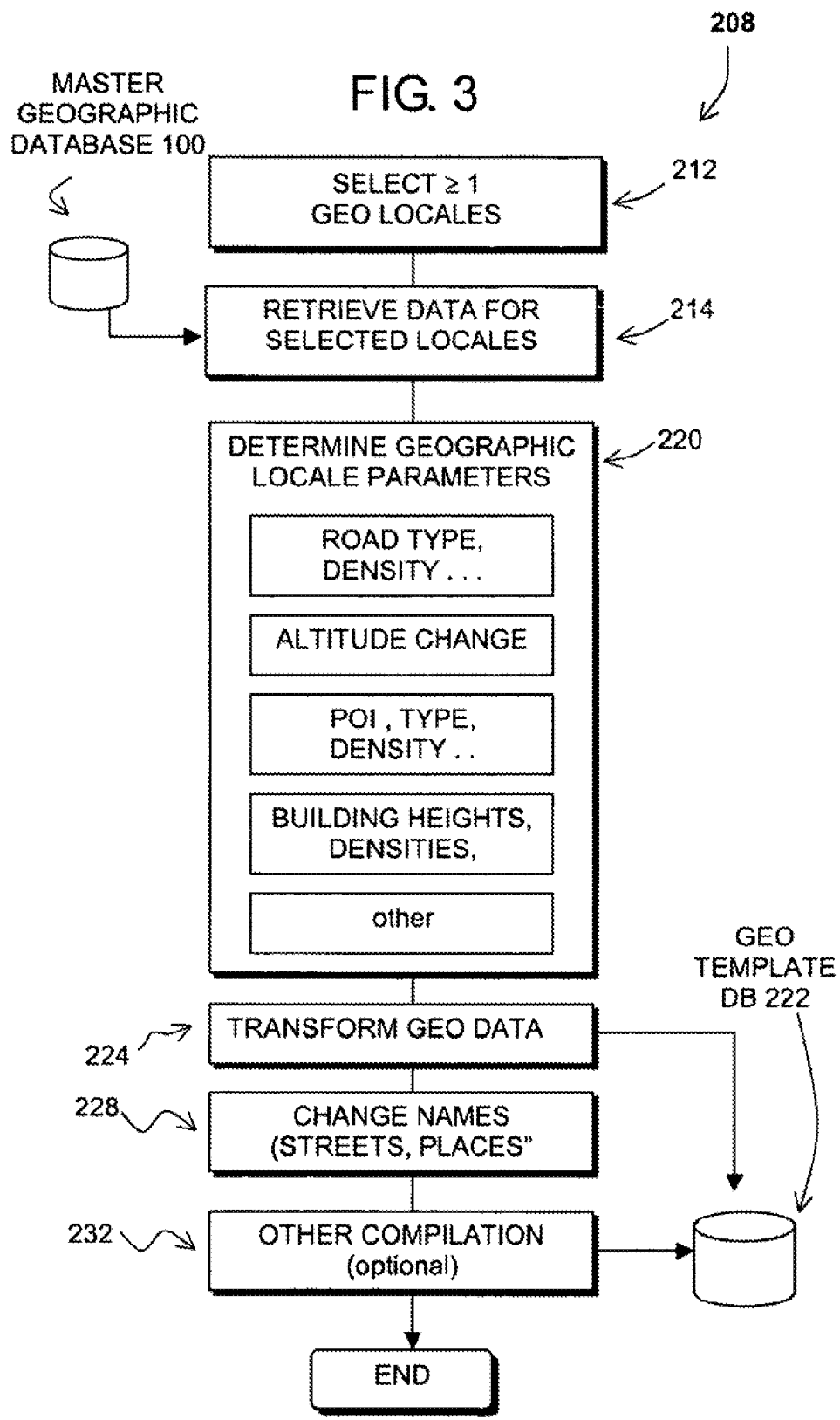
FIG. 3 is a flowchart of steps in a process performed by the template compiler of FIG. 2.

FIG. 3 shows steps in a process 208 performed by the template compiler program 204 for making a geographic template product 200 for use in a computer game that depicts or represents an imaginary geographic locale as part of the play scenario of the game. In this embodiment, the process 208 is performed by the geographic database developer 101.

The imaginary geographic locale represented by the geographic template product may be locale that is similar to one or more actual locales. For example, the imaginary locale may be a southern California city. The imaginary geographic locale may also be a fantasy locale. The imaginary geographic locale may also be an actual locale but set at a different historical period (past or future) than the present.

In a first step of the process 208, one or more geographic locales are selected (Step 212). In this step, the locales may include metropolitan areas, such as a southern California metropolitan areas like the Los Angeles metropolitan area or the San Diego metropolitan area. Alternatively, the locales may include metropolitan areas, such as Midwestern metropolitan areas like the Chicago metropolitan area and the Detroit metropolitan area. These locales may be selected manually, e.g., by a human operator selecting the areas. Alternatively, the locales may be selected automatically using a computer program that automatically uses the data in the master geographic database 100 to select locales within a selected region that have similar geographic characteristics like road density. For example, if an operator selects a region, e.g., southern California, a program automatically identifies major urban areas in the region.

Once the geographic locales have been selected, data that represent the locales are obtained from the geographic database 100 (Step 214). In one embodiment, all the data in the master geographic database 100 that represent the selected locales are obtained. Alternatively, only some of the data in the master geographic database 100 that represent the selected locales are obtained. For example, only selected attributes that represent the locales may be obtained.

After the data that represents the selected locales has been obtained, certain parameters of the geographic locales are determined (Step 220). These parameters characterize the locales. These parameters are obtained by comparison of the corresponding data from the different locales. (If only a single locale is selected in Step 212, the parameters are determined from data that represents only the single locale.)

Examples of the types of parameters that are determined include the following:

Overall size. For example, one parameter that is determined indicates the average overall size of the locales. This parameter may be determined by calculating the average of the overall areas of the locales for which data have been obtained.

Road density (by type). Another parameter is a road density distribution. Some geographic locales have large (in area) sections with densely-spaced streets.

Road shape. Another parameter is a road shape. Some geographic locales tend to have road with lots of curves, whereas other locales tend to roads that are relatively straight.

Road widths. Another parameter indicates the different types of road widths and the percentage of each type.

Expressway density. Some geographic locales have a relatively large number of expressways.

Road orientation. Some locales tend to have roads all aligned in a north-south, east-west grid pattern.

Road alignment. Some locales tend to have a lot of roads that do not meet at right angles.

Altitude variety. Some locales tend to have many altitude changes, e.g., lots of hills.

Geographic features. These parameters indicate the types, sizes, shapes, number of geographic features, such as lakes, rivers, mountains, etc.

Open spaces. This parameter indicates the type, number, size, density, etc., of open spaces in a locale. These may include parks, golf courses, etc.

POIs. This parameter indicates the types, density, number, etc. of the points of interest in the locales. These points of interest include businesses, government buildings, monuments, stadiums, airports, etc.

Buildings. This parameter indicates the types, sizes, shapes, etc., of the buildings located in a locale.

Signage. This parameter indicates the types of signs, the text on different signs, sign shape, sign layout, the density and placement of signs, etc.

There may be other parameters that are determined in addition to these. A parameter can be determined for any type of data contained in the geographic database 100.

Once the parameters have been determined for the locales in the selected region, a template 222 is formed (Step 224). The template has a structure similar to a geographic database that represents an actual region. However, the template does not represent an actual locale. Instead, the template is based on the parameters so that its characteristics are similar to those of all the locales in the selected region. For example, if the selected region is southern California, and the selected locales include Los Angeles and San Diego, a parameter for expressway density would indicate relatively many expressways per square mile. A template formed for this region would have an expressway density that corresponds to this parameter.

One way to form the template database is to start with one of the actual databases and transform the data. For example, starting with a database that represents Los Angeles, each data entity representing a road segment (or groups of data entities representing groups of road segments) would be modified to alter the location of the represented road segment. Some techniques that may be employed to form the template database from the actual database include moving the locations of roads by varying distances, switching the relative vertical ordering of roads that cross each other at different elevations, forming mirror images of roads located in an area, performing horizontal or rotational transformations of the location of groups of roads, and so on. Quality assurance testing would be used to insure that the modification maintained database integrity, including connectivity of the modified road network.

A similar process would be used for data that represented other kinds of represented features, such as points of interest, geographic features, such as lakes, rivers, etc., buildings, and so on.

Once this information has been prepared and stored in the template geographic database, names are determined for the represented geographic features (Step 228). In determining street names, a thesaurus function may be used to obtain similar names that correspond to real world names. For example, if streets in the real world database are named "Oak" and "Pine", the template database may include corresponding streets named "Elm" and "Poplar."

After the name information is added to the template 222, other compilation steps may be performed on the template 222. These other compilation steps may be similar to the steps performed on the geographic database products 110 used for navigation purposes.

The template 222 is provided to the game developer 130. The template 222 is used by the computer game developer 130 in a similar manner as an actual geographic database would be used. The computer game developer 130 uses the template 222 data, along with other data and components, to create one or more computer games 132.

In creating computer games 132, the computer game developer 130 may include some or all the data from the template 222. Alternatively, the computer games 132 may include data derived from or based on data from the template 222. The geographic data in the computer game 132 eventually produced by the computer game developer 130 may be in a different format than the data contained in the template 222.

Figure 4:
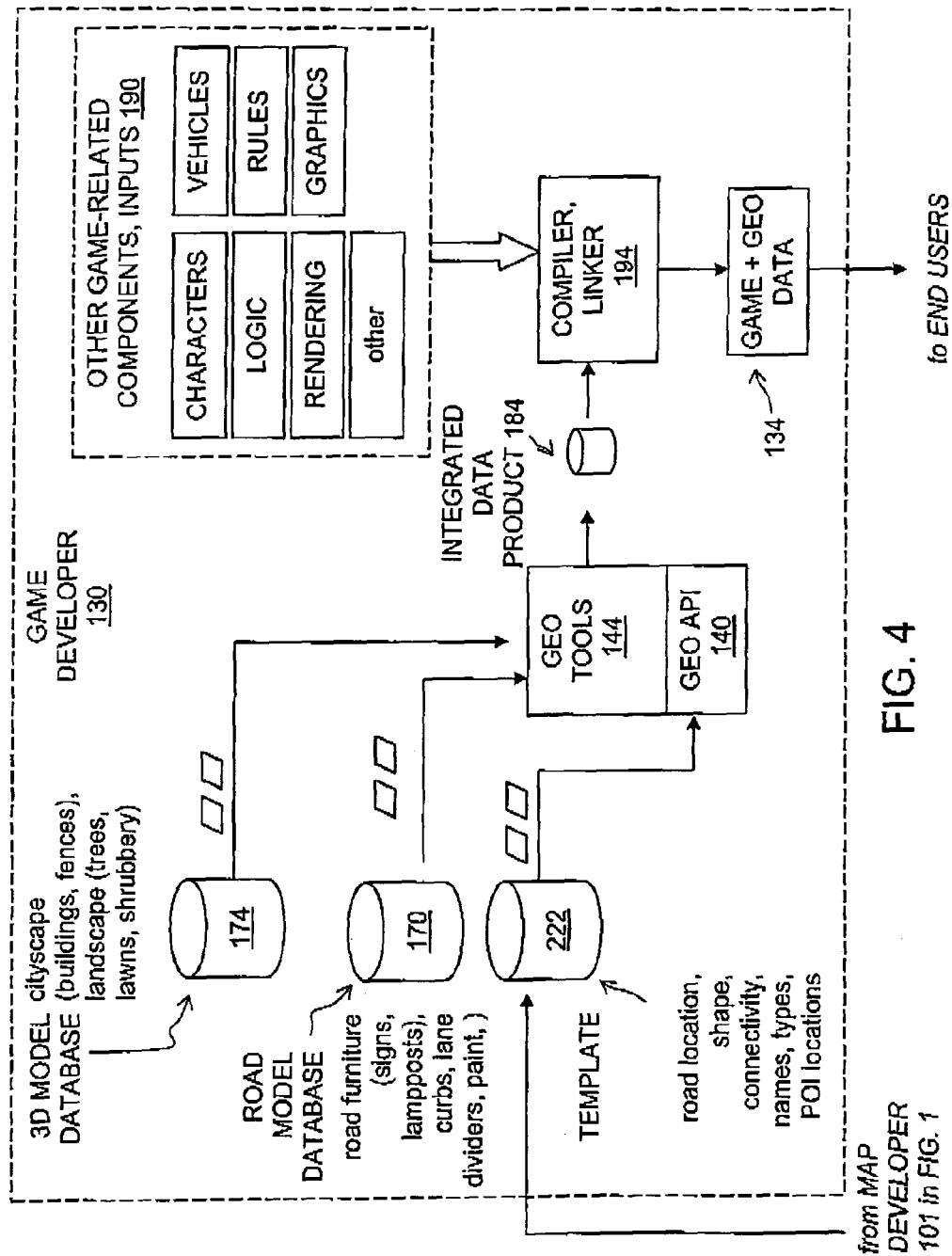
FIG. 4 is a block diagram showing components of a system used by a computer game developer that uses the geographic template produced by the process of FIG. 3.

Referring to FIG. 4, the computer game developer 130 may use a geographic data API (application programming interface) 140 and geographic data tools 144 to access and use data contained in the template 222. In one embodiment, the API 140 and data tools 144 are similar or identical to the interface layer and related navigation applications described in U.S. Pat. Nos. 5,974,419, 5,953,722, 5,968,109 and 6,047,280, the entire disclosures of which are incorporated by reference herein. In general, the geographic data API 140 provides a library of functions that facilitate accessing the data contained in the template 222.

The geographic data API 140 and data tools 144 provide various ways that the data in the template 222 can be accessed. Some of the ways the geographic data API 140 and data tools 144 provide for accessing the geographic database 100 are described in the copending application entitled. "METHOD AND SYSTEM FOR USING GEOGRAHIC DATA IN COMPUTER GAME DEVELOPMENT", bearing application Ser. No. 10/798,459 filed Mar. 11, 2004, the entire disclosure of which is incorporated by reference herein.

Using the geographic data API 140 and data tools, the game developer combines the template 222 with road model data (which adds visual representations of various road-related things, such as lampposts, lane markers, pavement colors, and so on), 3D model data (which add buildings, trees, etc.) and other game related components (such as characters, game logic, vehicles, game rules, and so on). In the computer game product, the template may be integrated into the code base or may exist separately.

The computer games 132 created using the data from the template 222 provide for representing geographic features in play scenarios of the computer games. The geographic features depicted by the computer games do not represent actual, real world geographic features, but are similar to the kinds of actual features that a person would find in a typical locale in a given geographic region. These depicted features include a road network, which is similar to the kind of road network a person would find in a typical locale in the given geographic region. This simulated road network in the template can be provided with the same level of accuracy and detail as a real road network.

The computer games 132 produced using the geographic template 222 are installed on appropriate computer platforms 134. The computer platforms 134 on which the computer games 132 are installed may include personal computers, game consoles, PDAs, handheld game devices, mobile phones, networked computers, and so on. Users access the computer games 132 on the computer platforms 134 to play the games.

III. Second Embodiment

Figure 5:
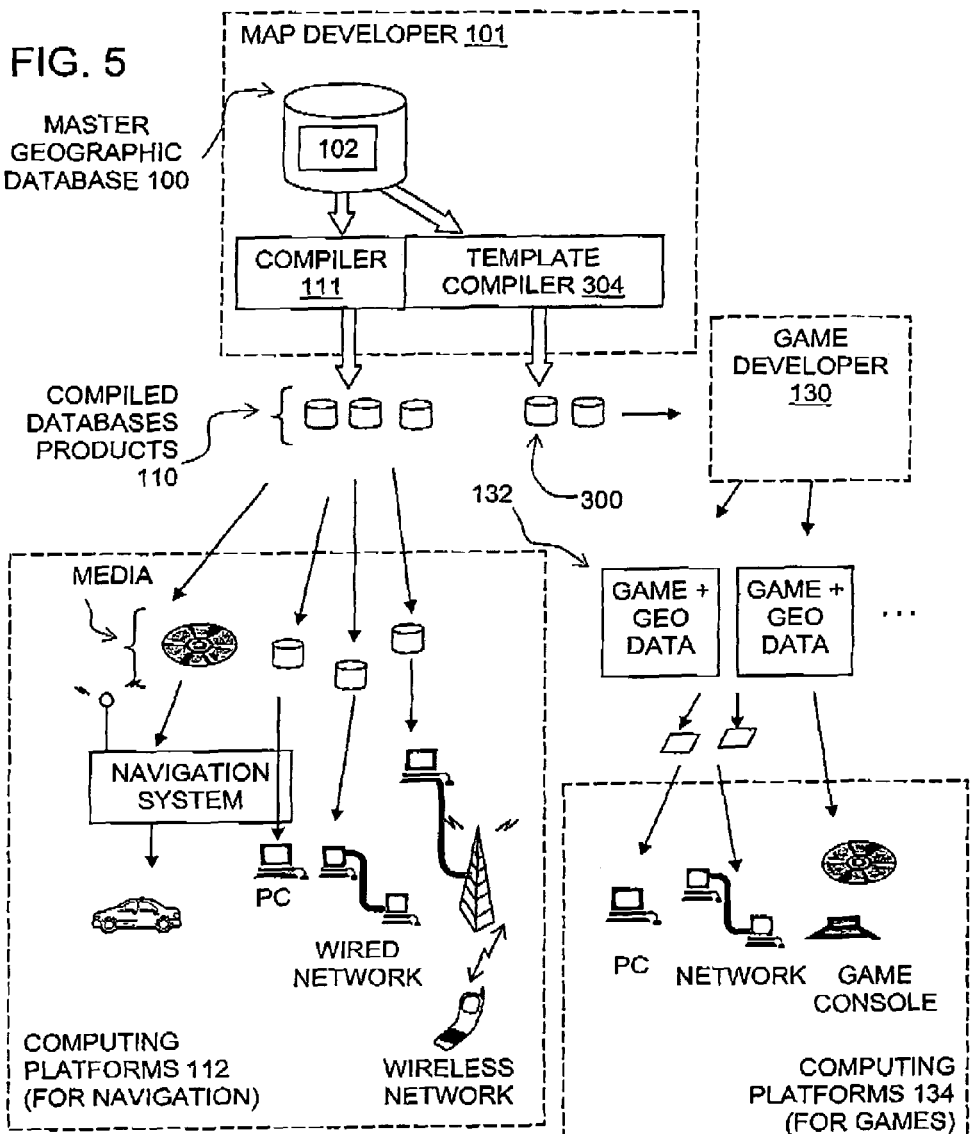
FIG. 5 is a block diagram showing a second embodiment of a system for facilitating development of computer games using a template derived from the geographic database of FIG. 1.
Figure 6:
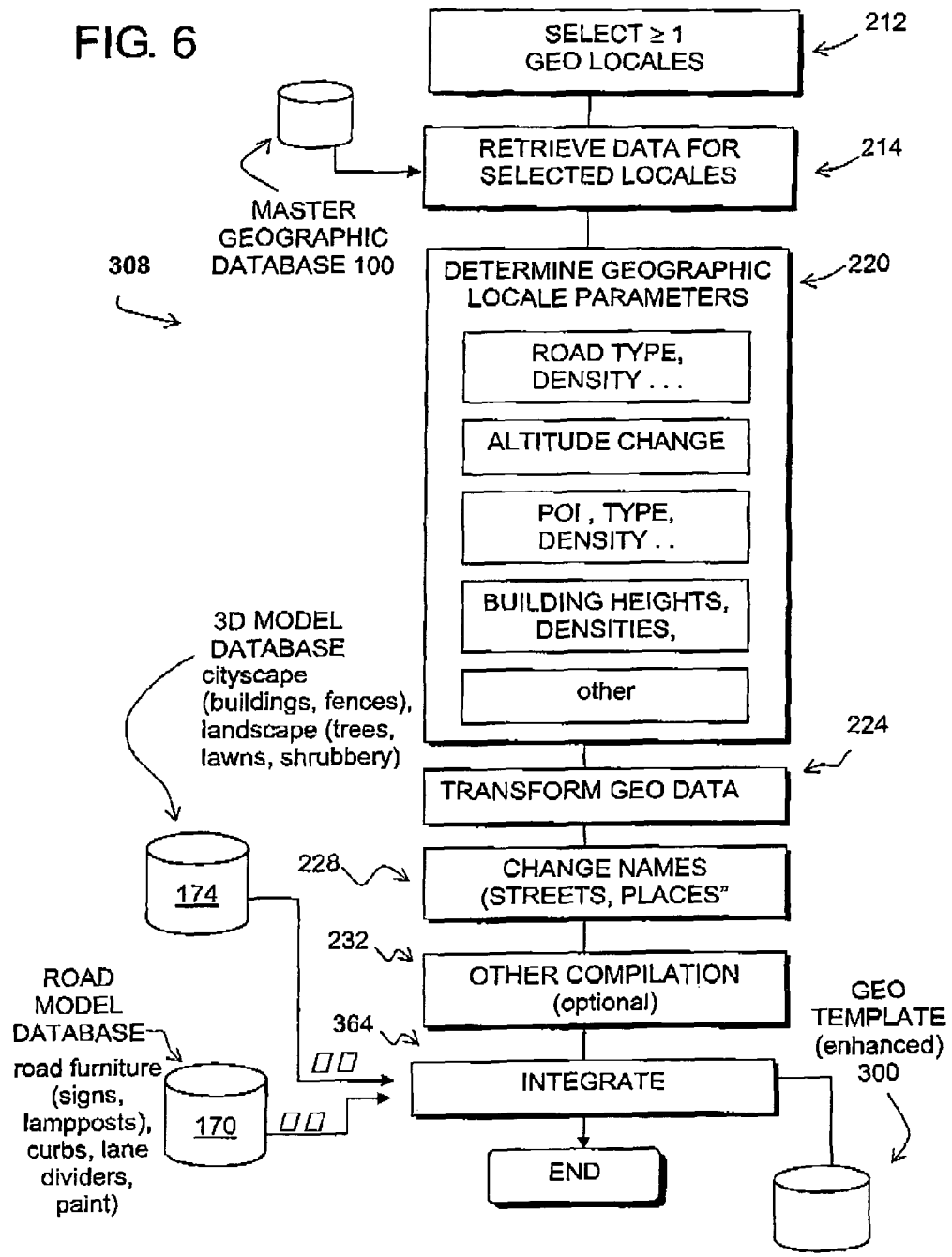
FIG. 6 is a flowchart of steps in a process performed by the template compiler of FIG. 5.

FIG. 5 shows a second embodiment of a system for developing a computer game using a template that contains data that represents a simulation of real world geographic features of the current time or of past or future times. FIG. 6 shows a flowchart of a process 308 performed by the system of FIG. 5. The process 308 can be performed by the map developer 101 in FIG. 5 using the template compiler 304 in FIG. 2. The process 308 of FIG. 6 is similar to the process 208 of FIG. 3, and like steps are indicated by the same numerals.

The process of 308 in FIG. 6 differs from the process 208 in FIG. 3 in that after a basic geographic template is formed using data that represents actual geographic features in actual locales (Step 228 or 232), additional data is added to the basic template by the map developer 101. In this embodiment, the additional data that may be added to the template includes road model data obtained from a road model database 170 and 3D model data obtained from a 3D model database 174. (In the first embodiment described in connection with FIGS. 3 and 4, road model data and 3D model data are added to a geographic template by the game developer.)

The data in the road model database 170 are representations used for visual appearance and rendering of road-related things, such as road pavement, lane stripes, curbs, sidewalks, signs, lampposts, lane dividers, traffic signals, speed bumps, crosswalks, and so on. These road model representations are associated with data representation of the simulated road network formed in the first part of the process 308. As stated above, the data representation of the simulated road network formed in the first part of the process 308 is derived from representations of road networks used for navigation. As such, the data representation of the simulated road network formed in the first part of the process 308 may not indicate what roads, or things associated with a road, look like. For example, the data representation of the simulated road network formed in the first part of the process 308 may indicate the locations (e.g., geographic coordinates) of intersections, and possibly the locations of points along a road segment between intersections, the legal (and illegal) connections between roads, the names of roads, the addresses ranges along roads, the type of road surface, and so on. However, in the data representation of the simulated road network formed in the first part of the process 308 may not contain information that indicates the actual visual shapes, colors, dimensions, etc., of these road-related things. For example, the data representation of the simulated road network formed in the first part of the process 308 may not indicate the colors of a road, curbs, sidewalks, what a sign looks like, and so on. The road model database 170 includes these types of information.

An integration step (Step 364 in FIG. 6) provides for associating data in the road model database 170 with data from the representation of the simulated road network formed in the first part of the process 308. The integration step 364 may associate road model data with specific locations along a road segment (as represented in the data representation of the simulated road network formed in the first part of the process 308) or with lengths along such a road segment. As an example, the integration step 364 may provide for showing curbs (using a model for what a curb looks like from the road model database 170) along all side streets (represented by data from the representation of the simulated road network formed in the first part of the process 308). In another example, the integration step 364 may provide for showing barriers along all the sides of expressways (using a model for barriers from the road model database 170) as represented by data from the template. The integration step 364 may also provide for associating data models for traffic signals at simulated intersections represented in the template formed in the first part of the process 308.

The data representations of road-related things in the road models database are also used for providing other properties of the represented things, such as the physical and audio properties. For example, causing a simulated vehicle to move over a simulated curb causes the simulated vehicle to "bump." Similarly, a simulated vehicle "hitting" a simulated lamppost causes a simulated crashing sound.

The road model database 170 may include a variety of different data models for some types of road-related things. For example, there may be a number of different types of traffic signal configurations. These different types of traffic signal configurations are used to provide variety and to make the representation of the road network appear more realistic, i.e., so that all the traffic signal configurations do not look the same.

The map database developer 101 uses the integration step 364 to combine data from the road model database 170 with the representation of the simulated road network formed in the first part of the process 308 to provide a realistic appearing road network. The road model database 170 is not intended to represent the actual road-related things, such as the exact locations of or text on signs, or the exact configuration of traffic signals, etc. Neither the basics template formed in the first part of the process 308 nor the road model database may contain information that represents the actual location of signs or the exact configuration of traffic signals. However, the road model database 170 provides data for visually representing these road-related things in a manner that would be typical for the geographic area. So, for a residential neighborhood, the road model database would include models for sidewalks, cross walks, stop signs, etc., which would be associated with appropriate locations along the representation of the simulated road network formed in the first part of the process 308. The integration step 364 and the road model database 170 provide for both the density (how many signs per mile or how many lampposts per block) and the style (shape, height, sign text wording) of these road related things.

As mentioned above, the integration step 364 associates data from the 3D model database 174 with the representation of the simulated road network formed in the first part of the process 308. The 3D model data in the 3D model database 174 includes representations used for visual appearance and rendering of cityscape- and landscape-related things, such as buildings fences, trees, shrubbery, lawns, fences, clouds, scenery, and so on. The 3D model database may also include information such as POI types, business/residential zones, socio-economic information, etc. Like the road models, these 3D model representations are associated with locations along the simulated road network data representation contained in the template formed in the first part of the process 308.

The data representations of cityscape and landscape-related things in the 3D models database are also used for providing the other properties (e.g., physical and audio) of the represented things. For example, causing a simulated vehicle to strike a simulated building causes the simulated vehicle to stop and make a crashing sound. As another example, a simulated vehicle can drive over a simulated shrub, but not a simulated tree.

After the geographic database developer 101 has integrated the data representation of the simulated road network formed in the first part of the process 308 with the data from the road model database 170 and 3D model database 174, as appropriate, an enhanced template data product 300 is produced. This enhanced template 300 is provided to the game developer 130.

Figure 7:
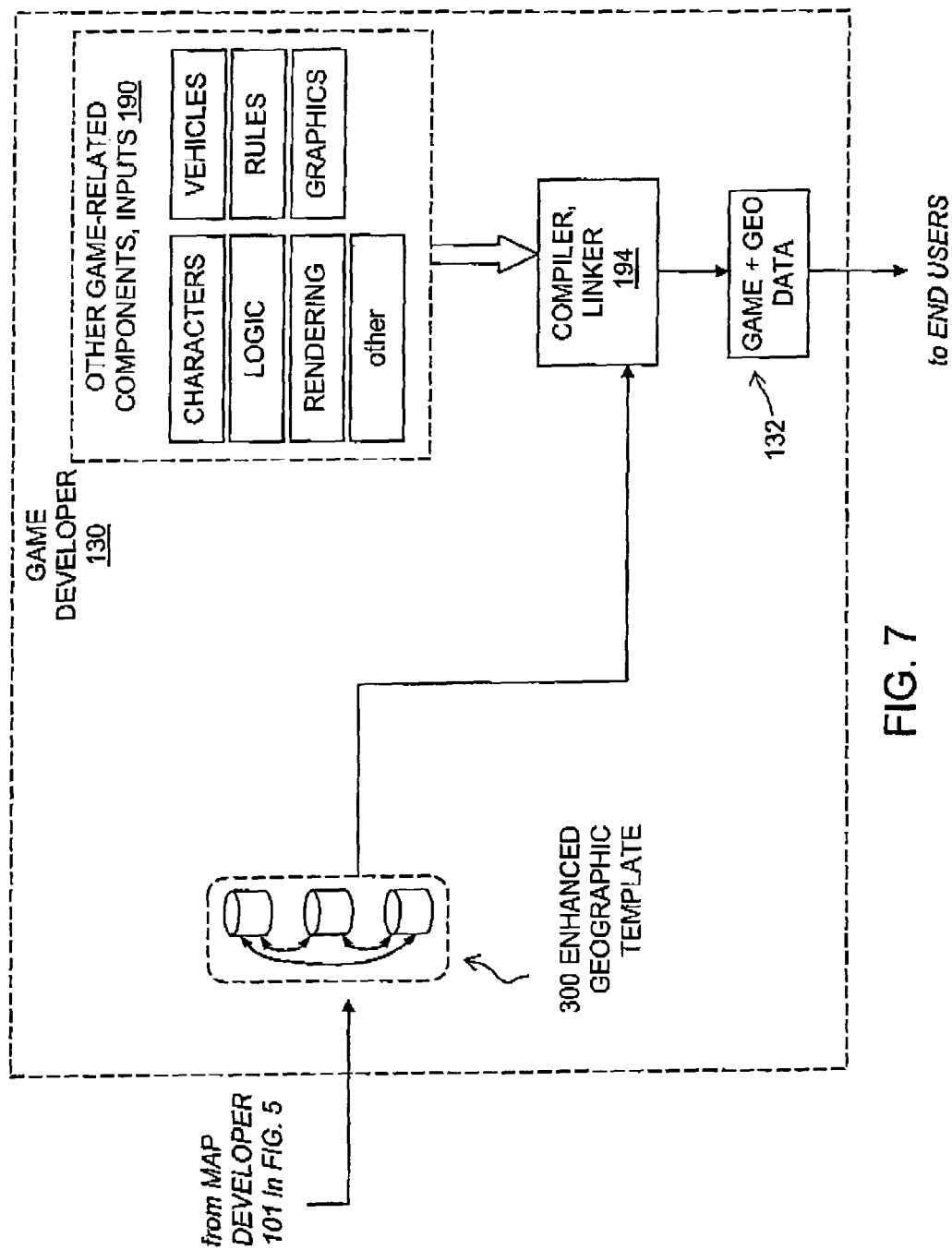
FIG. 7 is a block diagram showing components of a system used by a computer game developer that uses the geographic template produced by the process of FIG. 6.

Referring to FIG. 7, the game developer 130 uses the enhanced template 300 to produce computer games. The game developer 130 combines the enhanced template 300 with other game-related components and inputs 190. Among the other game-related components and inputs 190 are data and programs that provide and/or represent characters, game logic, vehicles (both for the first person game player as well as others), and game rules. The other game-related components and inputs 190 also include programs for rendering and graphics. The other game-related components and inputs 190 may also include components (e.g., applications, programs, etc.) that make specific use of the geographic data, such as a route calculation application that determines a route that can be used as part of the play scenario of the game. The development of some computer games may include additional components and/or inputs whereas other computer games may require fewer. Creation and development of these game-related components and inputs are known to those of skill in the art. The game developer 130 combines enhanced template 300 with the other game-related components and inputs 190 using a suitable linker and/or compiler 194. The computer game 134 produced by the computer game developer 130 is distributed (and/or sold or licensed) to end users using any suitable distribution channels.

IV. Third Embodiment

FIG. 8 shows another embodiment of a system for developing computer games using templates that contains data that represents simulations of real world geographic features of the current time or of past or future times. The system of FIG. 8 is similar to the system of FIG. 2 or the system of FIG. 5, and like components are indicated by the same numerals. The system in FIG. 8 differs from the other systems in that geographic templates are provided to the end users. The geographic templates that are provided to the end users may be the same as, or similar to, the geographic templates described above in the other embodiments. The geographic templates may be provided to the end users directly from the map developer or alternatively the geographic templates may be provided to the end users from the game developer. The end users use the geographic templates to help create their own geographic databases for use in their own computer games. According to this embodiment, end users could create their own data models of buildings, scenery, characters, vehicles, etc., based on real world or imaginary places, and combine these data models with templates of their own choosing. The end users may create their own data models or may insert other data from other sources, such as freeware, custom design studios, third parties, etc. The process by which end users combine their data models with geographic templates would be similar to those processes described above by which data models are combined with geographic templates by the map developer or the game developer. Suitable applications and programming tools would be made available to end users for this purpose. In one embodiment, an application programming interface (API) would be used in an end user's computer game to access a geographic template which had been provided to the end user. An application programming interface suitable for this purpose is described in the copending patent application entitled "APPLICATION PROGRAMMING INTERFACE FOR GEOGRAPHIC DATA IN COMPUTER GAMES", bearing application Ser. No. 10/798,531 filed Mar. 11, 2004, the entire disclosure of which is incorporated by reference herein. End users would be able to use the geographic templates, with their added data models, in their computer games, as described above.

V. Alternatives

In the embodiments disclosed above, it was described how template geographic databases could be developed so that the imaginary places represented by the template geographic databases resembled or possessed the style of types of actual, real world places, such as southern Californian city. In alternative embodiments, template geographic databases can be developed that represent other types of imaginary places, such as fantasy places or historical (past or future) actual places. For example, using an embodiment disclosed herein, a template geographic database can be developed that represents New York City in the 1930's.

The embodiments disclosed herein describe use of geographic data in computer games. The embodiments disclosed herein can be adapted for using geographic data for other non-navigation-related purposes. Among these other, non-navigation purposes are simulations and movie making. For example, the embodiments disclosed herein can be adapted for using geographic data for simulation systems. Simulation systems that can use geographic data include systems that simulate emergency operations (such as evacuation procedures or emergency vehicle deployment and routing), driver education systems, etc. When using any of the disclosed embodiments for movie making, a relatively high visual accuracy may be required and therefore attributes that provide for relatively high visual accuracy may be needed. However, fewer attributes of some types may not be required.

The embodiments disclosed herein can also be used in movie making. Many movies use computer-generated images of real (or imaginary) locations, instead of actual images. The embodiments disclosed herein can be adapted for creating realistic-looking geographic locations, including features such as road networks, for use in movie making.

The embodiments disclosed herein can be used on various different types of computer platforms, including client-server platforms and peer-to-peer platforms. The embodiments disclosed herein can be used with streaming or other technologies.

The embodiments disclosed herein may also be used for games that use geographic data obtained from multiple sources, e.g., more than one source geographic database. In these embodiments, the data from the multiple source geographic databases may be combined by the game developer or by another party.

In the embodiments disclosed above, it was described how a template that represents an imaginary locale for use in computer games could be derived from data that represents actual geographic places and which is used for other non-game-related functions. In an alternative embodiment, a template for use in computer games may be derived from data collected specifically for the purpose of use in computer games. According to this embodiment, the template could represent an actual or an imaginary locale and would be sold or licensed to game developers for use in computer games.

VI. Advantages

The disclosed embodiments solve a problem facing the computer game industry, namely the need to expend significant resources to gather geographic information for use in individual game titles.

As mentioned above, the templates provided by the disclosed embodiments may include more than road network data and may include such items as 3D building views, POI types, business/residential zones, socio-economic information, etc.

The template disclosed herein is a new product. The template may be used to provide what a typical European or Mid-West United States city looks like. The template would depict the typical POI placement in relation to other POIs and residential buildings, how its streets regulate traffic, and how newer cities tend to be designed differently than older cities, etc.

VII. EXAMPLES

The following are examples of different types of computer games and/or applications that can be developed using the disclosed embodiments. (Note that some of the games are new and some are updates and/or improvements of prior games.)

A. City Development Simulation Game

Geographic data that represents actual, real-world locales can be used in a type of computer game in which players simulate growth of an urban (or other regional) environment. In this kind of game, players simulate building cities or other places (such as towns, countries, rural areas) by designing roads, utilities (e.g., electrical, sewage, water) and other infrastructure elements for a geographic area. Then, the computer game allows a virtual city to develop based on the designs. The virtual cities can be detailed including individual zoning requirements (e.g., residential, commercial, industrial, etc.), crime layers (i.e., that can be changed by implementing police stations), traffic, unemployment and other realistic features.

Geographic data that represents actual, real-world locales can be used in this type of game to provide a high level of realism thereby allowing game players to build cities based on real world city models. In this type of game, players may choose a specific city model (e.g., Paris), and attempt to improve or replicate it. The inclusion of real time traffic, weather, points of interest (periodically updated or real time) and other real world content would serve to increase the realism of such a virtual city. This improvement could add realism, player loyalty, recognition, and an alternative goal to this popular type of game.

B. Virtual Person Development Simulation Game

Geographic data that represents actual, real-world locales can be used in a type of computer game in which game players simulate development of a virtual person (e.g., a "sim"). In this kind of computer game, players build a virtual person by managing that virtual person's habits, tendencies, house, family, job and interactions with other virtual people. In prior simulation games of this type, the locales in which virtual people live were non-specific In prior simulation games of this type, the locales were modeled from the view of the player's virtual house and may have included some features specific to the game manufacturer.

Data from a source of geographic data that represents actual, real-world locales can be used in this type of game to provide a high level of realism, thereby allowing players to build virtual characters in models of real cities, with models of actual real-world points of interest, streets, landmarks and neighborhoods. When starting this type of game, which has been enhanced by the addition of geographic data that represents actual, real-world locales, a player chooses a real world city. Once the city has been chosen, neighborhoods from the city become available for the player to select (e.g., Chicago's Gold Cost, Lincoln Park, Rogers Park, River North, or specific suburbs). Once the player selects a neighborhood, the player's virtual person would be able to simulate visits to virtual attractions based on real world local attractions, e.g., go to popular restaurants and bars, work in local businesses, and reflect how life is lived in that specific area almost as if he/she were living there.

C. "Bot-fighter" Game

Geographic data that represents actual, real-world locales can be used as a backbone for a "bot-fighter"-type game. This enhances the bot-fighter-type game by incorporating detailed spatial data that represents real world locales. A "bot-fighter"-type game can be played on mobile phones. In this game, players build "warrior robots" on their mobile phones using credits (e.g., virtual money) from battles won against other players. All firing between warriors is done via SMS messaging over the mobile phones. With mobile phone technology, a player may be given rough coordinates to his or her player-enemies or be warned when a player-enemy has entered his/her area or turf via mobile phone positioning technology.

The addition of geographic data that represents actual, real-world locales can give this type of game greater appeal. Specific route data and location details or spotting could be provided instead of simple proximity alerts. The addition of geographic data that represents actual, real-world locales would enable this type of game to support more precise boundaries. Further, with the addition of geographic data that represents actual, real-world locales, a game player's weapons could be given more accurate range limitations, rather than rough limitations available with existing games.

In addition, game credits (e.g., virtual money) could be spent on routes, enemy interception (based on known movements or historical patterns) courses, or enemy spotting locations.

D. Traffic Management Game/Application

In this computer game/application, data that represents the road network in the real world is used in combination with traffic feeds and models in order to simulate a real city with its existing traffic patterns. Once a model of an actual city with its road network and traffic patterns is created, predictive modeling and comparisons to other cities allow the user to tweak, re-model, or re-design traffic architecture to improve the road network with the objective to create the most efficient traffic system or to make the most improvements to an existing system.

This computer game/application can include a vehicle fleet management feature. According to this feature, the game player is given a virtual fleet of vehicles (e.g., starting with two trucks) in an initially chosen city and an overlay of existing traffic conditions. The goal of the game with the fleet management feature would be to provide service to a customer base (i.e., based on real world businesses represented in the real world geographic database and some zoning data). Time of day for delivery, fleet routing, fuel expenditures, pickup points and schedules etc., would all be managed by the game player.

Traffic flow, incidents, bottlenecks and other traffic data would be displayed. Wired or live devices would also have the ability to add live or updated data. Traffic would be made up from individual vehicles, following typical vehicle movement patterns (e.g., gapers, cars driving down the shoulder, etc.) or could be built from scratch.

E. Emergency Services and Law Enforcement Games

Geographic data that represents actual, real-world locales can be used in emergency services scenario-type games or law enforcement scenario-type games. These games include themes related to fire fighting, medical emergency services (e.g., ambulance, search and rescue), police chases, etc. Game developers who make these kinds of games can use the disclosed embodiments to provide realistic looking locales, possibly with the addition of location-based content (e.g., actual buildings, businesses etc.), traffic, weather, points of interest, etc., as part of the playing scenarios of these games.

F. Location Quiz Game

Geographic data that represents actual, real-world locales can be used in a location quiz-type of computer game. In this type of game, game players are provided with clues about a game character's secret location and attempt to determine the secret geographic location. Using geographic data that represents actual, real-world locales adds a measure of realism to this type of game and increases its educational value.

One feature of this game is the ability to personalize the game to a player's locale. Players would be able to search for the secret location in their own city or neighborhood. For example, parents could use the game to teach their children how to get around in their own neighborhoods. According to this example, parents could set up the game to include the route that their child takes to and from school. Also, if a family moves to a new neighborhood, the parents could obtain up-to-date digital map data that represents the new neighborhood in order to teach their children about the new neighborhood.

Adding digital map data to the game would also provide the capability to play it anywhere the player is located. For example, a child from Chicago who is on vacation in Paris could search for the game character in Paris and thereby learn about the city.

G. Children's Atlas

Another computer game/application that can use geographic data that represents actual, real-world locales is a children's atlas game/application. This computer game/application can be used by families on long car trips. In one embodiment, this game/application could be used to answer children's questions such as "Are we there yet?" or "Where are we?" with distances and times to destinations.

One version of this game includes a communications feature that allows a child to communicate with other children who have games with the same feature. Another version of this game/application allows a game player to create a virtual travelogue that describes and records travels in real time.

In one embodiment, a children's atlas game/application would be developed as a travel companion game that obtains location information from an in-vehicle navigation system or remote server. As a car in which the child is a passenger drives through a specific locale (e.g., a town or attraction) or a more general area (e.g., a state), the children's atlas application would display images and use voice narration to provide facts about the area. The children's atlas game/application would also provide well-known stories or legends about an area (e.g., Johnny Appleseed as the child is traveling through the Appalachians).

In another alternative embodiment, the children's atlas includes a travel pal feature. This feature allows a child traveling through an area to connect online with other children who located in the area. In one version of this feature, children can communicate with other traveling children or with other children located in the area a child is passing through using instant messaging. A buddy list may be formed and used for this purpose. Children could access this service while traveling or at home. For example, children could exchange information about their travels or play games. Children passing through a particular place could instant message with children living in the area and ask questions about the area, e.g., what do the locals think about the best places to eat, what is the best radio station, etc.

According to another alternative embodiment, the children's atlas application includes a virtual travelogue feature. The virtual travelogue feature allows a child to collect, store, and send information about his or her travels as a trip is taking place. The child could take information provided by the atlas game/application, annotate it with personal experiences and observations, and send it to friends and relatives, or to a home website that eventually turns into a scrapbook of the entire trip (or perhaps a report on a school field trip), complete with maps, pictures and postcards from the area, voice narration, and any other data collected along the way.

The virtual travelogue feature could also catalogue and automatically store every place the child has traveled. The child could then display or print out a map that shows all the places he or she has been and how he or she got there.

H. Simulated Tour

Another application that can use geographic data that represents actual, real-world locales is a simulated tour application. This simulated tour application uses geographic data, POI data, 3D modeling, and other data, such as weather, traffic, crime statistics, and restaurant guides, to build a realistic view of a city or other locale for virtual touring. The simulated tour application could be used by people considering moving to a new area, or could be hosted by realtors, or used by travelers, or simply used by individuals to learn more about different locations.

With this application, one can learn, understand, explore, or market a specific area. This application would portray an area visually, textually, and possibly even audibly. Smells (e.g., heavy fog, chocolate factory nearby—pervasive) could be provided using appropriate technology or described textually.

One use for this application is to provide a way for a person to become familiar with driving in an unfamiliar city. Some cities may have driving conventions that are unfamiliar to some people. For example, speed limits are painted on the road in California and Hawaii whereas they are located on little signs in Illinois. According to another example, traffic is particularly aggressive in Rome and lanes are viewed as guidelines, not rules etc.

I. Car Rally Challenge Game

Another computer game that can be improved using geographic data that represents real world places is a car rally challenge-type game. This game can be played in single player or multi-player versions. In this type of game, teams of game players travel actual routes that are sent to them from a central server. The server would store a number of car rally routes and attribute scenarios (e.g., points of interest as checkpoints) for a specific area (e.g., state, city, neighborhood, etc.), and these virtual rally instructions would be sent to the participating drivers and navigators.

An organizer's kit could also be offered that would cater to amateur car rally organizations or clubs. The kit would allow an individual or organization to create a customized car rally specific to a city or area. The rally information could be created on the rally organizer's personal computer within a program, or via download from a website. It could then be printed out and handed to the racers or downloaded to a device such as a PDA.

The difference between the game and the kit is that the game would send out pre-determined routes and rally features. The routes and features might change regularly but the players would not have a hand in planning or creating the rally scenarios. The kit would provide the basic tools and content to create a rally, thereby allowing the user to add local flavor, degrees of difficulty, or to even recreate a well-known rally course.

J. Location-based Virtual Monopoly Game

Geographic data that represents real world places can be used in a computer game based on the Monopoly board game. In one version of this game scenario, a game player's positions and movements in the real world are tracked, using positioning equipment such as GPS, cell phone triangulation, etc. These movements would be used to define game routes for that player. Then, the routes would be used to identify properties (e.g., actual or fictional) along that route the game player could virtually purchase, rent, etc., as in the classic board game. Real world conditions, such as traffic restrictions, road construction, tolls, etc., would be factored into the game play scenario.

K. Promotional Games and Contests

Geographic data that represents real world places can be used for promotional concepts (e.g., contests, sales events, and so on). Businesses, such as retailers or restaurant franchises, frequently use special promotions or contests to attract business. Adding location-based data and services to these promotions would allow businesses to better target, reach and track potential customers, and also add an extra dimension. Promotional tie-ins to location-based data could be developed using a variety of approaches.

L. Spatial Simulator for Exercise

Data that represents actual, real world places can be used with sports or exercise-related events or equipment. For example, geographic data can be used to enhance simulators (e.g., monitors) used on or with exercise equipment. Geographic data that represents real places can be used with a treadmill or exercise bicycle to simulate the experience of running or biking along a route. The route would be projected on a monitor or screen in front of the person on an exercise machine such as a treadmill or exercise bicycle.

Use of data that represents actual, real world places could allow users to feel as if they were running through the streets of a major city, e.g., along a marathon or 10K route, or biking the route of the Tour de France. The simulator could also be used to keep track of long-term training goals, such as running virtually across the entire United States.

A basic simulation would consist of a display of a basic overview map based on a route. For example, the user would ask for a route within a city and a basic map would be displayed showing the streets of the city with a mark on the map indicating the virtual position of the runner or bicyclist. The runner's progress along the route would be based on the runner's pace. The degree or category of simulation offered could vary depending on the level of realism desired. For example, details such as road elevation could be added to the simulation. This would allow the person exercising to experience the feeling of running or biking in the Rocky Mountains or through the plains of Nebraska.

A detailed simulation would use 3D data and give a full picture on a monitor of the buildings and landmarks along the route. This would give the runner or bicyclist a realistic feeling of running or biking along the route.

M. Classic Computer Games

Geographic data that represents actual, real-world locales can be advantageously used to make new versions of classic computer games like Snake and Pacman. In these new versions of these games, game players assume the identities of characters in the game. A player uses positioning equipment that determines the player's actual physical positioning the real world. The player also has equipment that provides for wireless communication with a central database. This player becomes a virtual player in a classic game such as PacMan or Snake. The games would be played in either an online competitive mode or a single player (player versus machine)

mode. In either case, the player acts as a character in the game. The distance and speed moved by the player would be translated to movement and speed in a virtual world, where the player may accomplish goals within the game or defeat other players. The system would be set up in translated "virtual boards" where a game would consist of an area regulated by the speed of transportation (a "board" for a vehicle can be significantly larger than one for a pedestrian).

N. Location Based Cannonball Run Car Racing Game

Another computer game that can use embodiments of the disclosed system and method for providing geographic data is a "cannonball run" car racing game. This game may be played in multi-player or single player mode. The multi-player mode game may be played online. In the game playing scenario, players compete against each other to race vehicles (e.g., cars, bikes, etc.) across a geographical area. Data that represent actual, real-world places would be used to add realism to the game, e.g., actual legal and physical restrictions. Alternative features include the addition of real-time traffic and weather conditions.

One scenario for a multi-player online version of the game would feature a community where players start out with a specific mode of transportation. This version of the game would provide an online culture and goal of being with the best group and driving the best vehicle. Players would start with a certain amount of virtual cash and a basic vehicle. Some races would be pre-defined events, whereas other races would be random city races with a user defined start and end points. The selection of routes for races would be based on real map data. The game would be based on winning virtual money by winning races, but winning a race could cost the player due to traffic tickets, illegal traffic maneuvers or other expenses. All fines would be based on legal restriction data and statistics of the percentage of drivers caught. Suggested routes would be provided in all races, and the amount of virtual cash used to buy a route would vary the quality or speed of the route.

Game players would have the option of racing through their hometowns, or through the streets of their favorite cities or countries all over the world. These would attract a larger demographic, and interest the casual game player as well.

O. Virtual Trip Planner and Simulation

Data that represents actual, real world places can be used for a computer simulation application that would allow a user to preview a trip or specific route by virtually driving it on his or her personal computer or game console. The simulation would be based on a representation of the geographic database that included 3D renderings of buildings, signs, topographical features, and other related attributes. The simulation software could be provided on media, through an online vendor, or rented to users on an as-needed basis. Users would enter a route request via their personal computers or consoles and could use gaming steering wheels, joysticks, voice commands, or keyboards to drive the routes. A fast forward function could be used to skip the obvious or mundane sections of the trip or to speed up the pace.

To make the simulation more realistic, traffic features, such as vehicles coming and going on the route, could be included. These could perhaps even be based on actual traffic patterns or real-time traffic for a selected time of day.

A feature of this simulation application would be as a form of trip planner. The planner would provide information about an area to which one is traveling, such as local history, area specific trivia games, and point of interest descriptions and recommendations. Users would have the option of using this information while driving the area in advance (e.g., using the simulation application, described above), printing out the planner in advance as a reference, or loading it onto a device and accessing it during an actual trip (e.g., going on a long trip and using the planner interactively to keep children amused and informed). For example, if a family was traveling on vacation from Chicago to Miami by car, the parents could research and preview the attractions, hotels, and restaurants at which the family may want to stop along the way. They could also preview the route and create their own form of trip ticket to plan the best route. The parents could then set up an itinerary that would include games, information, quizzes etc., that would occupy the children throughout the trip.

It is intended that the foregoing detailed description be regarded as illustrative rather than limiting and that it is understood that the following claims including all equivalents are intended to define the scope of the invention.

We claim:

1. A method for facilitating game development, the method comprising:
    producing, by a map developer, a source geographic database containing data representing a real-world locale including
    (i) geographic coordinates of positions of roads,
    (ii) street names of the roads,
    (iii) address ranges along the roads,
    (iv) turn restrictions at intersections of the roads,
    (v) road connectivity, and
    (vi) road shape;
    transforming, by the map developer, the data representing the real-world locale into data representing an imaginary geographic locale to form a template geographic database;
    storing, by the map developer, the template geographic database on a computer-readable medium; and
    providing, by the map developer to a game developer, the computer-readable medium containing the template geographic database, the game developer being separate from the map developer;
    wherein the template geographic database is used by the game developer along with other computer-game components to form a computer game.

2. The method of claim 1 wherein the data of the source geographic database are suitable for providing navigation-related functions for a real-world road network.

3. The method of claim 2 wherein the template geographic database provides a level of accuracy similar to a level of accuracy provided by the source geographic database for navigation-related functions.

4. The method of claim 2 wherein the template geographic database provides a level of detail similar to a level of detail provided by the source geographic database for navigation-related functions.

5. The method of claim 1 wherein transforming comprises:
    selecting a characteristic geographic parameter of the source geographic database; and
    using the selected characteristic geographic parameter and at least some data from the source geographic database when forming the template geographic database;
    wherein the template geographic database has a characteristic geographic parameter similar to the characteristic geographic parameter of the source geographic database.

6. The method of claim 5 wherein the selected characteristic geographic parameter is selected from the set consisting of: road density, road width, expressway density, roadway orientation, road alignment, altitude changes, points of interest, buildings, and signs.

7. The method of claim 5 wherein the selected characteristic geographic parameter comprises geographic features selected from the set consisting of: lakes, rivers, and mountains.

8. The method of claim 5 wherein the selected characteristic geographic parameter comprises open spaces selected from the set consisting of: parks and golf courses.

9. The method of claim 1 wherein transforming comprises applying an operation selected from the set consisting of: altering a location of a road segment, moving locations of roads by varying distances, switching a relative vertical ordering of roads that cross one another at different elevations, and performing horizontal or rotational transformations of locations of roads.

10. The method of claim 1 wherein the computer-readable medium is selected from the set consisting of: a magnetic disk, an optical disk, RAM, ROM, and a network transmission.

11. The method of claim 1 wherein providing the computer-readable medium containing the template geographic database comprises applying a technique selected from the set consisting of: selling the computer-readable medium and leasing the computer-readable medium.

12. The method of claim 1 wherein the other computer-game components include at least one of the set consisting of: characters, game logic, vehicles, game rules, and programs for rendering and graphics.

13. The method of claim 1 further comprising:
combining, by the map developer, data in the template geographic database with road-model data to provide a realistic visual appearance of roads in the imaginary geographic locale, wherein the road-model data comprise an element selected from the set consisting of: road pavement colors, lane stripe markings, curbs, sidewalks, signs, lampposts, lane dividers, traffic signals, speed bumps, and crosswalks.

14. The method of claim 1 further comprising:
combining, by the map developer, data in the template geographic database with 3D model data to provide a realistic visual representation of polygon-shaped features in the imaginary geographic locale.

15. The method of claim 1 further comprising:
combining, by the map developer, data in the template geographic database with 3D model data to provide a realistic visual representation of cityscape and landscape features in the imaginary geographic locale.

16. The method of claim 1 further comprising:
combining, by the map developer, data in the template geographic database with 3D model data to provide a realistic visual representation of an element selected from the set consisting of: buildings, fences, trees, shrubbery, lawns, fences, and clouds.

17. The method of claim 1 further comprising:
insuring, by the map developer, data integrity in the template geographic database, wherein insuring data integrity comprises checking road connectivity.

18. A computer-readable medium containing computer-executable instructions for performing a method for facilitating game development, the method comprising:
producing, by a map developer, a source geographic database containing data representing a road network in a real-world locale, wherein the data representing the road network include navigation-related attributes for digital route calculation and digital route guidance about the road network;
transforming, by the map developer, at least some data from the source geographic database to form a template geographic database, wherein the template geographic database contains data representing an imaginary geographic locale; and
storing, by the map developer, the template geographic database on a computer-readable medium, wherein the template geographic database is used for generating a computer game.

19. A method for facilitating game development, the method comprising:
producing a source geographic database containing data representing a plurality of road segments corresponding to a road network in a real-world locale;
transforming the data representing the plurality of road segments into data representing an imaginary geographic locale to form a template geographic database; and
storing the template geographic database on a computer-readable medium, wherein the template geographic database is used for generating a computer game.

20. The method of claim 19 wherein the data representing the plurality of road segments is not imagery data that correspond to visual appearances of roads.

21. The method of claim 19 wherein the imaginary geographic locale does not represent the real-world locale but includes a characteristic similar to the real-world locale.

22. The method of claim 21 wherein the similar characteristic comprises a characteristic from the set consisting of: road density, road shape, road width, expressway density, roadway orientation, road alignment, altitude changes, points of interest, buildings, and signs.

23. The method of claim 19 wherein data representing each of the plurality of road segments is associated with geographic coordinates and an address range.

24. The method of claim 19 wherein transforming comprises applying an operation selected from the set consisting of: altering a location of a road segment, moving locations of road segments by varying distances, switching a relative vertical ordering of road segments that cross one another at different elevations, and performing horizontal or rotational transformations of locations of road segments.

25. The method of claim 19 further comprising:
combining data in the template geographic database with road-model data to provide a realistic visual appearance of roads in the imaginary geographic locale, wherein the road-model data comprise an element selected from the set consisting of: road pavement colors, lane stripe markings, curbs, sidewalks, signs, lampposts, lane dividers, traffic signals, speed bumps, and crosswalks.

26. The method of claim 19 further comprising:
insuring data integrity in the template geographic database, wherein insuring data integrity comprises checking road segment connectivity.

27. A method for facilitating game development, the method comprising:
producing a source geographic database containing data representing a plurality of road segments corresponding to a real-world locale, wherein the data representing the plurality of road segments are configured to be compiled for navigation related functions in a vehicle navigation device;
transforming at least some data representing the plurality of road segments from the source geographic database to form a template geographic database, wherein the template geographic database contains data representing an imaginary geographic locale; and storing the template geographic database on a computer-readable medium, wherein the template geographic database is used for generating a computer game.

28. The method of claim 27 wherein producing the source geographic database and transforming to form the template geographic database is implemented by the same entity.

29. The method of claim 27 wherein the imaginary geographic locale does not represent the real-world locale but includes a characteristic similar to the real-world locale.

30. The method of claim 29 wherein the similar characteristic comprises a characteristic from the set consisting of: road density, road shape, road width, expressway density, roadway orientation, road alignment, altitude changes, points of interest, buildings, and signs.

31. The method of claim 27 wherein transforming comprises modifying a substantial portion of the data representing the plurality of road segments corresponding to a city of the real-world locale.

32. The method of claim 31 wherein modifying comprises an operation selected from the set consisting of: altering a location of a road segment, moving locations of road segments by varying distances, switching a relative vertical ordering of road segments that cross one another at different elevations, and performing horizontal or rotational transformations of locations of road segments.

33. The method of claim 27 further comprising:
combining data in the template geographic database with road-model data to provide a realistic visual appearance of roads in the imaginary geographic locale, wherein the road-model data comprise an element selected from the set consisting of: road pavement colors, lane stripe markings, curbs, sidewalks, signs, lampposts, lane dividers, traffic signals, speed bumps, and crosswalks.

34. The method of claim 27 further comprising:
insuring data integrity in the template geographic database, wherein insuring data integrity comprises checking road segment connectivity.

35. A method for facilitating game development, the method comprising:
producing a source geographic database containing data corresponding to roads in a real world geographic locale including
(i) geographic coordinates of positions of the roads,
(ii) street names of the roads,
(iii) address ranges along the roads,
(iv) turn restrictions at intersections of the roads,
(v) road connectivity, and
(vi) road shape;
transforming data representing a real-world road network structure from the source geographic database to form a template geographic database, wherein the template geographic database contains data representing an imaginary road network structure, wherein said step of transforming includes at least one of modifying of the positions of the roads and changing the street names of the roads; and
storing the template geographic database on a computer-readable medium, wherein the template geographic database is used for generating a computer game.

36. The method of claim 35 wherein transforming comprises:
selecting a characteristic geographic parameter of the source geographic database; and
using the selected characteristic geographic parameter and at least some data from the source geographic database when forming the template geographic database;
wherein the template geographic database has a characteristic geographic parameter similar to the characteristic geographic parameter of the source geographic database.

37. The method of claim 36 wherein the selected characteristic geographic parameter is selected from the set consisting of: road density, road width, expressway density, roadway orientation, road alignment, altitude changes, points of interest, buildings, and signs.

38. The method of claim 36 wherein the selected characteristic geographic parameter comprises geographic features selected from the set consisting of: lakes, rivers, and mountains.

39. The method of claim 36 wherein the selected characteristic geographic parameter comprises open spaces selected from the set consisting of: parks and golf courses.

* * * * *